(12) United States Patent
Segar et al.

(10) Patent No.: US 7,113,372 B2
(45) Date of Patent: Sep. 26, 2006

(54) HGA PLATEAU GIMBAL DESIGN

(75) Inventors: Richard L. Segar, Eagan, MN (US); Jennifer A. Engebrit, Burnsville, MN (US); Keefe M. Russell, Robbinsdale, MN (US); Gordon M. Jones, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 128 days.

(21) Appl. No.: 10/290,977

(22) Filed: Nov. 8, 2002

(65) Prior Publication Data

US 2003/0090839 A1 May 15, 2003

Related U.S. Application Data

(60) Provisional application No. 60/338,178, filed on Nov. 9, 2001.

(51) Int. Cl.
*G11B 5/48* (2006.01)
(52) U.S. Cl. .................................. 360/245.9
(58) Field of Classification Search ............ 360/245.8, 360/245.9, 246, 234.5, 234.6
See application file for complete search history.

(56) References Cited

U.S. PATENT DOCUMENTS

| 5,530,604 | A | 6/1996 | Pattanaik | 360/234.5 |
| 5,657,186 | A | 8/1997 | Kudo et al. | 360/234.5 |
| 5,680,275 | A | 10/1997 | Frater et al. | 360/234.5 |
| 5,696,651 | A | 12/1997 | Endo et al. | 360/245.8 |
| 5,734,523 | A | 3/1998 | Scheidecker et al. | 360/234.5 |
| 5,896,248 | A * | 4/1999 | Hanrahan et al. | 360/234.5 |
| 6,134,075 | A * | 10/2000 | Bennin et al. | 360/245.9 |
| 6,515,832 | B1 * | 2/2003 | Girard | 360/245.3 |
| 2001/0048573 | A1 * | 12/2001 | Kawai et al. | 360/234.5 |

FOREIGN PATENT DOCUMENTS

JP          2000-215428       *   8/2000

OTHER PUBLICATIONS

CVD Data Storage Bulletin, Dan Woods, R&D Manager and Senior Member Technical Staff, Texas Instruments, "Improved Disk Drives Through the Computational Power of DSP," Sep. 2000, p.p. 15-21.

* cited by examiner

*Primary Examiner*—Angel Castro

(57) ABSTRACT

The present invention includes an improved suspension assembly comprises a suspension including a load beam and a gimbal, a FOS having a polymer portion (or flex circuit) and a trace portion, wherein the FOS is connected to the suspension. The present invention further includes a slider that is electrically connected to a ground trace and the ground trace is further electrically connected to the suspension. The present invention also includes a plateau gimbal, which comprises of a portion of the ground trace positioned between the flex circuit and the slider thereby elevating the slider to the level of the bond pads on the FOS.

18 Claims, 10 Drawing Sheets

HGA PLATEAU GIMBAL DESIGN

CROSS-REFERENCE TO RELATED APPLICATION(S)

This application claims priority from and incorporates the entirety of provisional application No. 60/338,178 filed Nov. 9, 2001, for "HGA PLATEAU GIMBAL DESIGN" by Richard L. Segar, Jennifer A. Engebrit, and Keefe M. Russell.

FIELD OF THE INVENTION

The present invention relates to an improved head gimbal assembly. More particularly it relates to mechanical features of the head gimbal assembly gimbal that improve alignment capabilities of the slider to the head gimbal assembly gimbal and improves the overall conductivity of the system.

BACKGROUND OF THE INVENTION

Air bearing sliders have been extensively used in disc drives to appropriately position a transducing head above a rotating disc. The transducing head is typically carried by the slider. Conventionally, head positioning is accomplished by operating an actuator arm with a large-scale actuation motor, such as a voice coil motor (VCM), to radially position the slider over a track on a disc. Typically, disc drive systems include a suspension assembly attached to the actuator arm for supporting and positioning the slider. The suspension assembly includes a load beam attached to the actuator arm and a gimbal disposed at the opposite end of the load beam. A flex circuit material is deposited on the gimbal and the actuator arm. The air bearing slider carrying the transducing head is mounted to the flex circuit material. This type of suspension assembly is used with both magnetic and nonmagnetic discs. The VCM rotates the actuator arm and the suspension assembly to position the transducing head over a desired radial track of the disc.

In order for the disc drive to read and write data from the transducing head, conductive traces are disposed along the flex circuit material of the suspension assembly for the disc drive to electrically communicate with the slider. The traces extend along the gimbal and end at flex on suspension (FOS) bond pads formed adjacent to the slider. The slider has a forward face with bond pads disposed on the forward face such that an electrical connection can be made between the traces and the slider. Typically gold ball bonds are used to provide the connection between the FOS bond pads and the slider bond pads. Difficulties have arisen in prior art systems for attaching the slider to the gimbal, and in particular with respect to aligning the slider bond pads to the FOS bond pads.

Several factors affect slider alignment to the FOS bond pads. These factors include flex circuit material alignment to the gimbal, slider alignment to the gimbal, the dimensional features of the gimbal, slider and flex circuit material, and the method of assembly. Slight variations in each of these combine to form a tolerance stack-up, which is the addition of variations that occur during the assembly of the suspension assembly. A poor suspension assembly design fails when the variations are extreme.

The head gimbal assembly (HGA) product design evolved from a FOS over to a FOS under trace routing with the advent of HGA automation. A FOS over design employs a FOS on the non-disk side of the HGA with flying FOS traces tab bonded to the slider bondpads. The FOS over design results in a thin adhesive bondline between the slider and the stainless steel gimbal. Historically, this has provided consistent resistance performance required by the drive design. The HGA automation process requires a FOS under configuration, or FOS on the disk side of the suspension. This FOS under configuration implements a slider to FOS trace ballbond interconnect process. This new configuration employs a layer of polyimide spaced between the slider and stainless steel gimbal. The increased slider to gimbal spacing increased the bondline resistance (to greater than $10^8$ ohms) and drove the requirement for new wafer level processes to compensate for slider to FOS trace alignment tolerances. Therefore, there is a need for an HGA that provides a small bondline resistance to improve BER (bit error rate), reduce system noise, and match ESD/EOS wafer design protection feature requirements.

Typically, the slider is placed on the gimbal with respect to a load point on the load beam. The load beam has a dimple located at its distal end which serves as the load point. The gimbal is attached to the load beam such that it balances about the dimple and the flex circuit is attached to the gimbal so that the flex circuit is centered relative to the dimple. Placing the slider with respect to the dimple minimizes the degradation of the slider's fly height above the disc. However, by placing the slider on the gimbal with respect to the dimple, the slider bond pads are often either too far away or too far forward of the FOS bond pads. It results in an increased tolerance stack up of the slider with respect to the FOS bond pads.

The ball bond HGA design requires that the slider be placed in close proximity to the FOS bond pads. Furthermore, some HGA manufacturers purchase preassembled gimbals where the flex circuit material is already deposited onto the gimbal. Due to limitations in the manufacturing process, the location of the FOS bond pads may change slightly from assembly to assembly so that the precise location of the bond pads is difficult to predict. The FOS bond pad strength may be reduced as well. The unpredictability of the FOS bond pad locations make proper alignment of the slider on the gimbal more difficult, so that the likelihood of the slider bond pads aligning with the FOS bond pads decreases. As a result, the slider ends up too far away or too far forward of the FOS bond pads.

If the slider is too far away from the FOS bond pads, a too large gap occurs between the slider bond pads and the FOS bond pads. A too large gap results in a low contact area between the ball and the bond pads, therefore a weak interconnect or no connection occurs between the slider bond pad and the FOS bond pad. A weak interconnect leads to an increased potential failure mode of the electrical connection between the slider bond pads and the FOS bond pads.

If the slider is too far forward the slider overlaps the FOS bond pads. An overlapping assembly will result in a low slider-to-gimbal bond strength and a large pitch static attitude shift.

Pitch static attitude is the angle of the slider air bearing surface in relation to the baseplate of the suspension. Static attitude impacts fly height, take off velocity in the prior art system and the reliability of the head disc interface. The increased pitch of the slider due to misalignment described above results in a non planar air bearing and causes increased fly height variability. When the slider is not attached to the gimbal with the required static attitude, a post assembly adjustment must be done to change the static attitude at an additional cost and with detrimental effects to other suspension characteristics.

A slider design is needed in the art that improves the alignment between the slider and the dimple on the load beam in a manner that provides a strong interconnect between the FOS bond pads and the slider bond pads, results in a high slider to gimbal bond strength, a small pitch static attitude shift, and provides a tolerance buffer which allows the slider to be placed relative to the suspension assembly load point without degrading mechanical structure.

SUMMARY OF THE INVENTION

The present invention includes an improved suspension assembly comprises a suspension including a load beam and a gimbal, a FOS having a polymer portion (or flex circuit) and a trace portion, wherein the FOS is connected to the suspension. The present invention further includes a slider that is electrically connected to a ground trace and the ground trace is further electrically connected to the suspension. The present invention also includes a plateau gimbal, which comprises of a portion of the ground trace positioned between the flex circuit and the slider thereby elevating the slider to the level of the bond pads on the FOS.

These and various other features as well as advantages which characterize the present invention should be apparent to those skilled in the art upon reading the following detailed description and review of the associated drawings.

DETAILED DESCRIPTION

Figure 1:
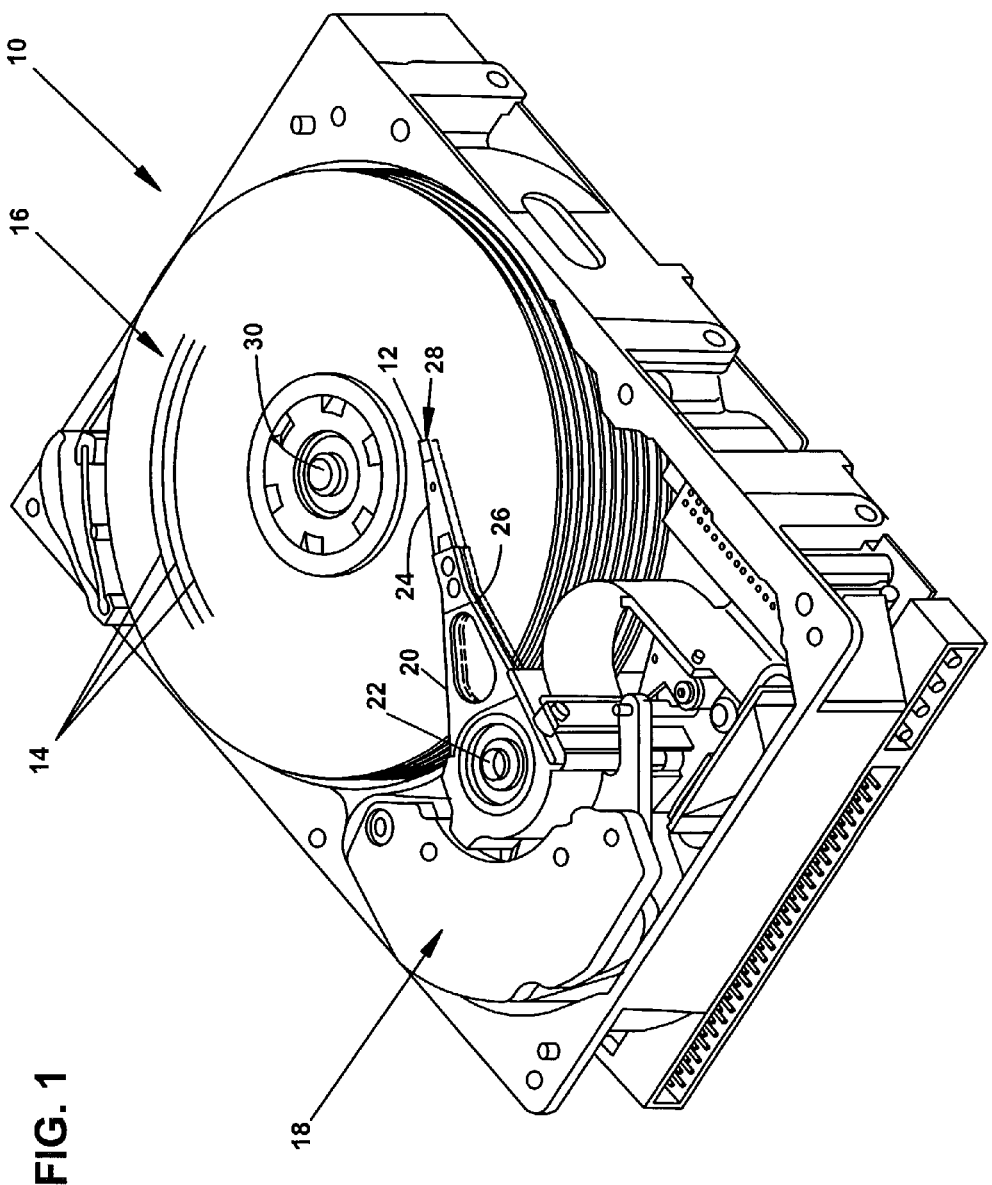
FIG. 1 shows a top perspective view of a disc drive actuation system for positioning a slider over tracks of a s disk.

FIG. 1 is a perspective view of a disc drive 10 including an actuation assembly for positioning a slider 12 over a track 14 of a disc 16. Disc drive 10 includes a voice coil motor (VCM) 18 arranged to rotate an actuator arm 20 on a spindle around an axis 22. A load beam 24 is connected to actuator arm 20 at a head mounting block 26. A gimbal 28 is connected to an end of load beam 24 and slider 12 is attached to gimbal 28. Slider 12 carries a transducing head (not shown in FIG. 1) for reading and/or writing data on concentric tracks 14 of disc 16. Disc 16 rotates around an axis 30 so that windage is encountered by slider 12 to keep it aloft a small distance above the surface of disc 16. FIG. 1 shows a disc drive having an upper and lower actuation assembly, with the lower actuation assembly being shown in phantom.

Figure 2:
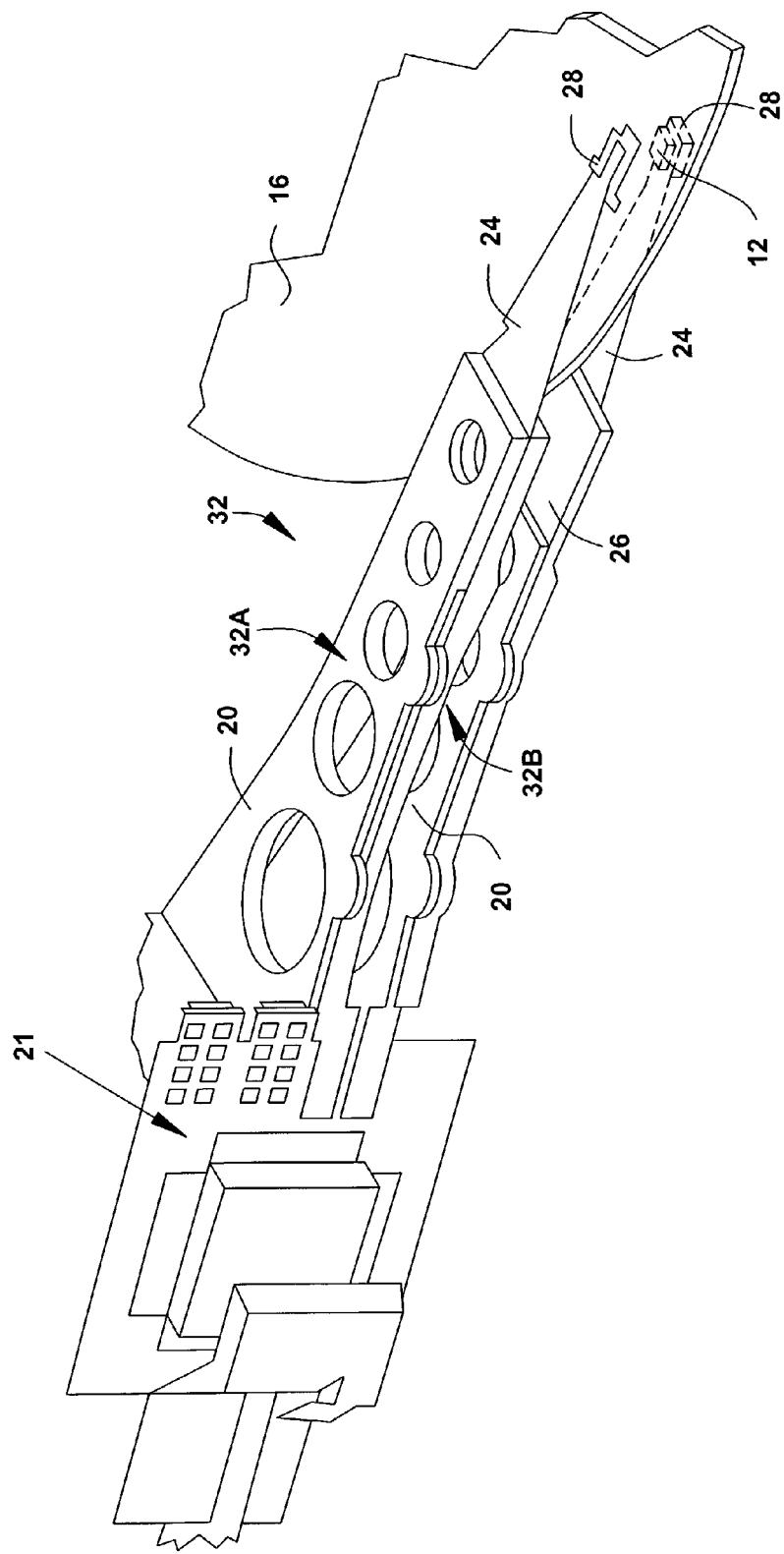
FIG. 2 shows a portion of the disk drive actuation system.

FIG. 2 is a perspective view of an actuation assembly 32 for positioning slider 12 over track 14 of disc 16. Actuation assembly 32 includes an upper assembly 32A and a lower assembly 32B that are identical. Both the upper assembly 32A and the lower assembly 32B have actuator arm 20 with load beam 24 connected to the actuator arm 20 at head mounting block 26. Gimbal 28 is connected to an end of load beam 24, and slider 12 is attached to gimbal 28. Slider 12 carried by upper assembly 32A reads and writes data from an upper surface of disc 16. Slider 12 located on lower assembly 32B reads and writes data from the lower surface of disc 16. Also included is print circuit card ("PCC") 21.

Figure 3:
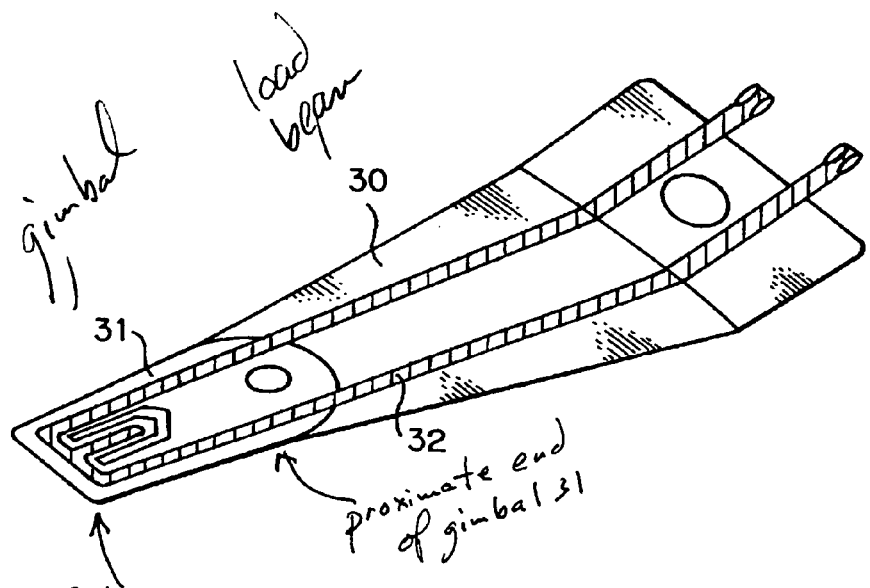
FIG. 3 shows an exploded perspective view of a distal portion of the disc drive actuation system of FIG. 2.

FIG. 3 is an exploded perspective view of the distal end portion of actuation assembly 32. Shown in FIG. 3, from top to bottom are load beam 24, gimbal 28 and slider 12. Load beam 24 has a dimple(not shown) formed on the bottom of load beam 24 at a distal end 36. Gimbal 28 is attached to load beam 24 relative to the dimple. A flex circuit material 75 is attached on slider opposing face 40 of gimbal 28. Slider 12 attaches to gimbal 28 and is positioned on gimbal 28 such that slider 12 is centered on the dimple. Flex circuit material 75 is located between slider 12 and gimbal 28.

Slider 12 includes a disc opposing face 42 and a gimbal opposing face 44, which is attached to the slider opposing face 40 on the bottom surface of gimbal 28. Slider 12 has a leading edge 46 and a trailing edge 48. A forward face 50 is disposed on trailing edge 48 of slider 12. Forward face 50 extends between the disc opposing face 42 and gimbal opposing face 44. Slider bond pads 52 are formed on the forward face 50 of slider 12.

Gimbal 28 is configured to allow slider 12 to move in pitch and roll directions to compensate for fluctuations in the spinning surface of disc 16. Transducing head (not shown) is located on disc opposing face 42 of slider 12 proximate to trailing edge 48. In operation, load beam 24 and gimbal 28 carrying slider 12 move together as coarse positioning is performed by VCM 18 (FIG. 1) to rotate actuator arm 20 (FIG. 1).

Figure 4:
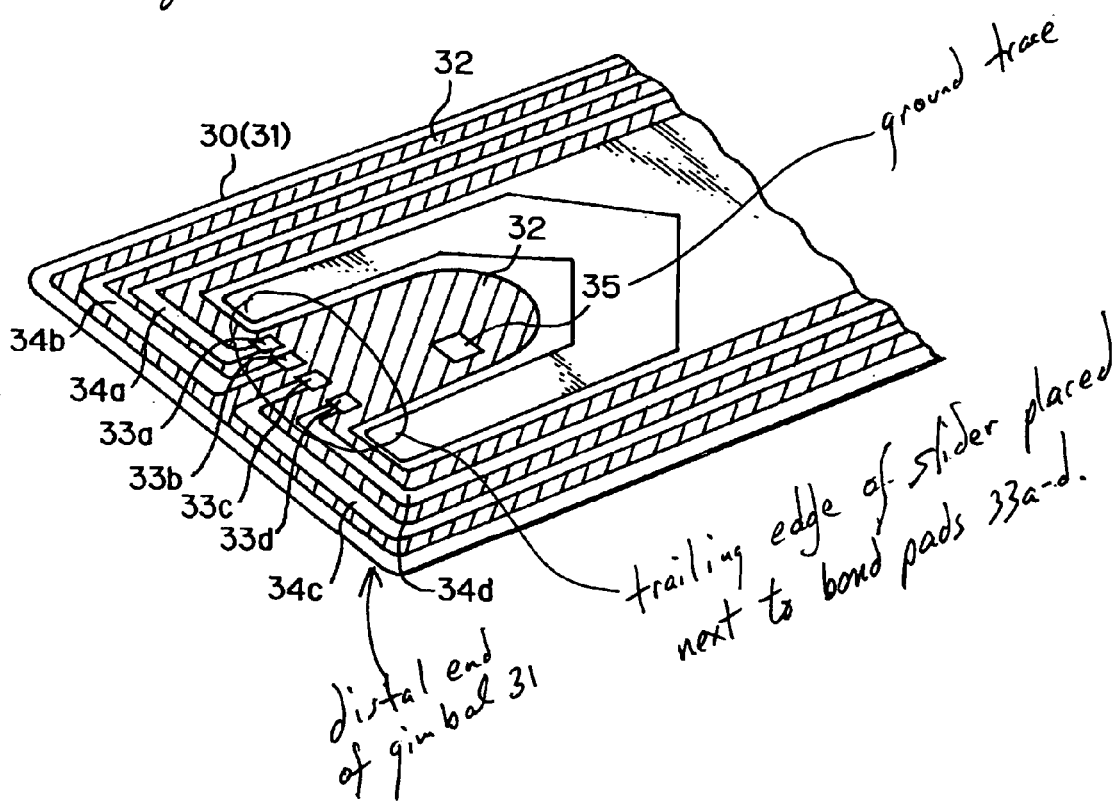
FIG. 4A shows an exploded perspective view of one embodiment of an assembled distal portion of the disk drive actuation system of FIG. 3.
FIG. 4B shows an exploded perspective view of an assembled distal portion of the disk drive actuation system of FIG. 4.
Figure 4A:
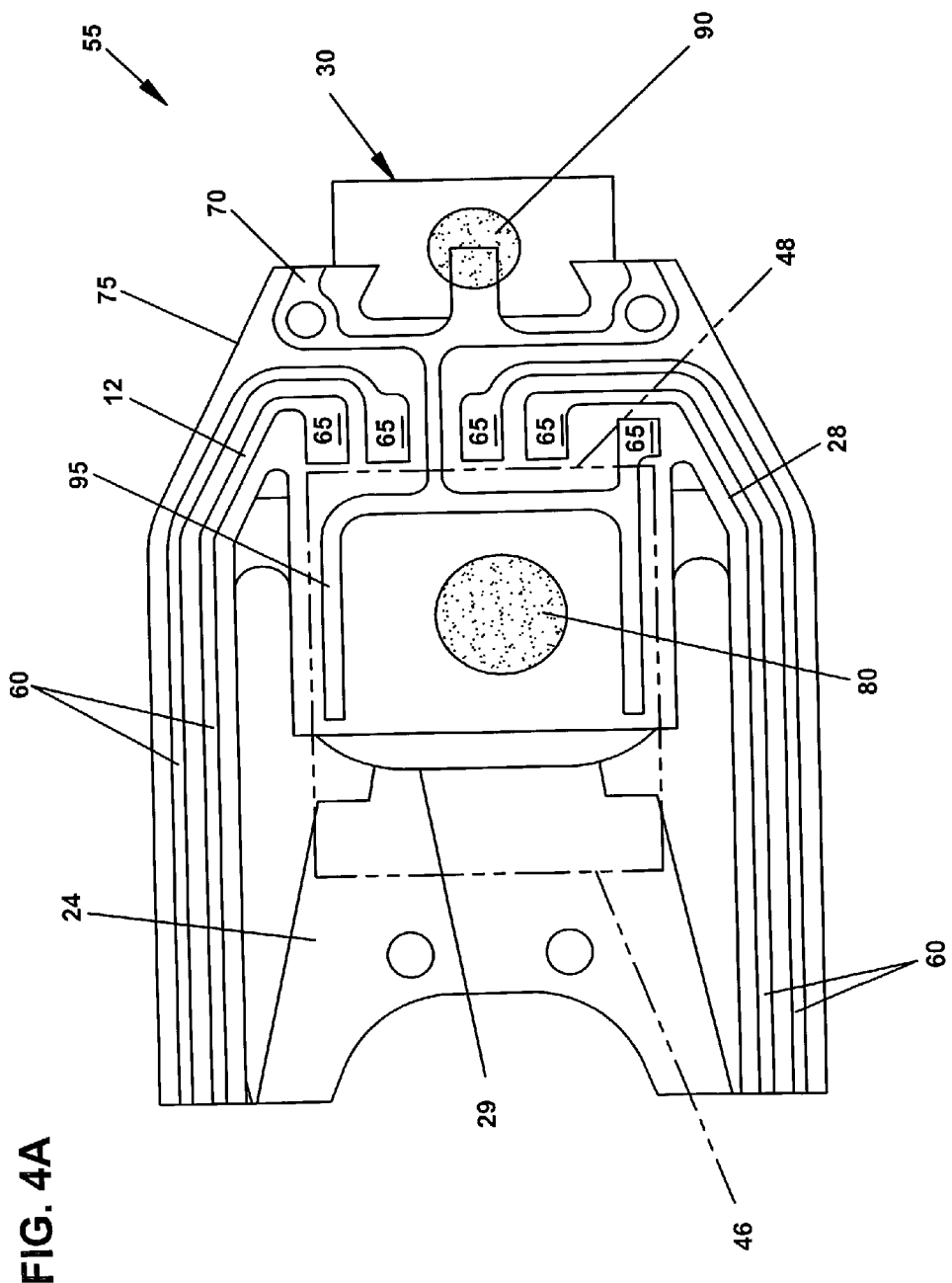
Figure 4B:
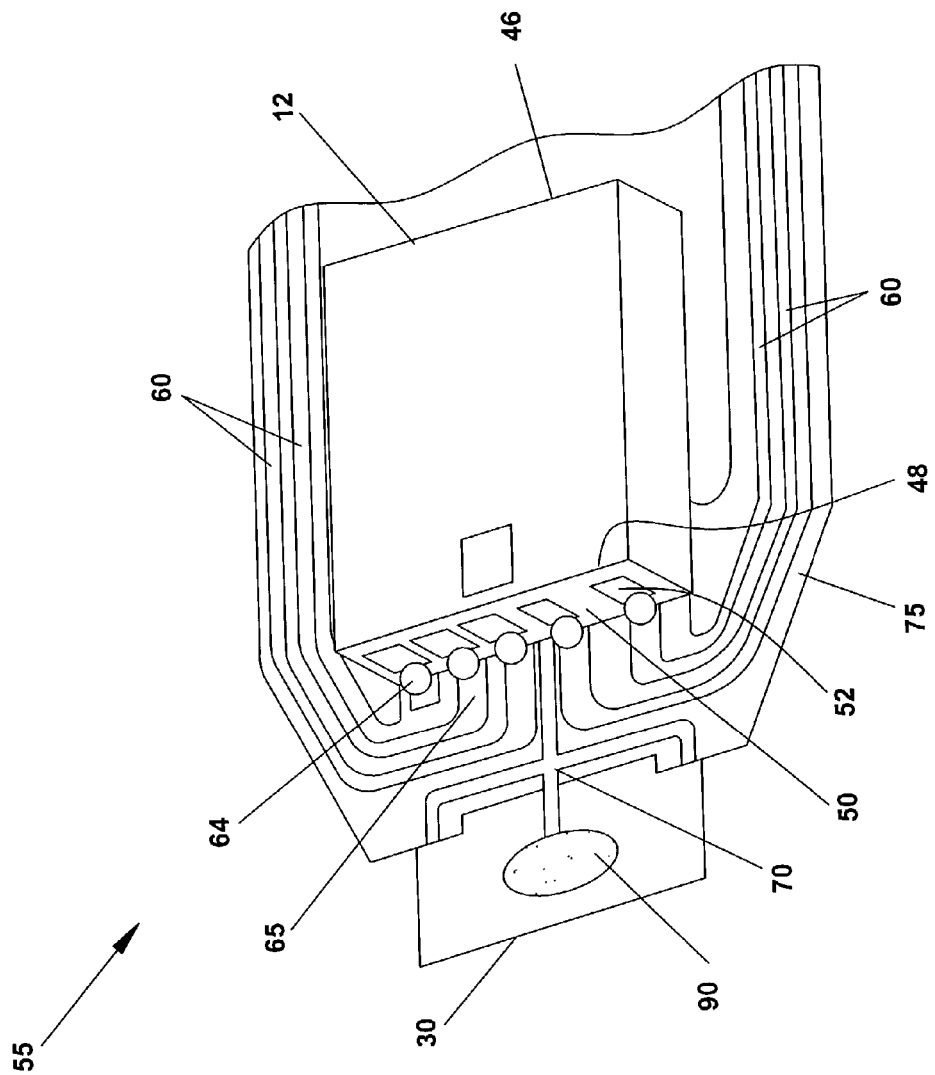

FIG. 4A and 4B are exploded perspective views of one embodiment of an assembled distal portion of the disk drive actuation system of FIG. 3. Improved HGA design 55 includes gimbal 28, which is attached to load beam 24. Gimbal 28 includes a gimbal tongue having a proximal 29 and distal 30 end. Flex circuit material 75 is disposed on slider opposing face 40 (as seen in FIG. 3) of gimbal 28. In the preferred embodiment of gimbal 28, flex circuit material 75 is disposed on gimbal 28 where the slider 12 attaches. Flex circuit material 75 generally travels along the underside or disk side of gimbal 28, load beam 24, and along the length of the actuator arm 20 all the way to circuitry located in another part of the disc drive (not shown). Flex circuit material 75 on slider opposing face 40 of gimbal 28 engages gimbal opposing face 44 (FIG. 3) of slider 12.

A trace layer 60 is disposed upon flex circuit material 75. Trace layer 60 completes a circuit connection between the electronic components of the disc drive (not shown) and a transducing head (not shown) carried by slider 12. Trace layer 60 travels along the underside of gimbal 28, load beam 24 and along the length of the actuator arm 20 on top of flex circuit material 75. Trace layer 60 is typically made of copper with gold plated on top of the copper layer. Each trace 60 ends at a flex on suspension (FOS) bond pad 65. In an exemplary embodiment there is at least one FOS bond pad 65 located on flex circuit material 75 for each active slider bond pad 52 located on slider 12. FOS bond pads 65 are preferably located proximate to the distal end of gimbal tongue 30 of gimbal 28 and forward of where slider 12 is attached to gimbal 28. One skilled in the art would appreciate moving the FOS bond pads 65 to different locations of the FOS and moving the slider bond pads 52 to different locations of the slider without departing from the present invention.

Slider 12 has a disc opposing face (as viewed in FIG. 3 on the bottom of slider 12) and gimbal opposing face 44 (as viewed in FIG. 3 on the top of slider 12). Gimbal opposing face 44 is attached to gimbal 28 on slider opposing face 40 (as viewed in FIG. 4 on the bottom of gimbal 28) of gimbal 28. The transducing head (not shown) is located on disc opposing face 42 of slider 12. When slider 12 is attached to gimbal 28, forward face 50 of slider 12 is located proximate and substantially parallel to the distal end of the gimbal tongue 30. Thus, slider bond pads 52 located on forward face 50 of slider 12 are positioned proximate to FOS bond pads 65. A structural adhesive 80 is used to bond slider 12 to gimbal 28 with flex circuit material 75 between slider 12 and gimbal 28. During operation, when slider 12 flies above the disc, slider 12 typically possesses three primary degrees of movement, which are vertical motion, pitch and roll rotation.

When slider 12 is attached to gimbal 28, the slider bond pads 52 are aligned with FOS bond pads 65. A gold ball bond 64 is disposed on each slider bond pad 52 (as seen in FIG. 4B). Ball bond 64 is bonded to slider bond pad 52 and its respective FOS bond pad 65 to create an electrical connection between slider 12 and trace layer 60. Ball bonds 64 act as an electrical conduit and complete the electrical connection between slider 12 and trace layer 60.

Head gimbal assembly (HGA) manufacturers have implemented automation as a means for reducing labor and overhead costs. For example, slider 12 may be manufactured in bulk in an automated process. In addition, the ball bond interconnect design is used by most disc drive manufacturers because it is particularly suited for automated methods of electrically connecting the slider to gimbal 28. In addition to bonding, automation is also used to place slider 12 on flex circuit material 70 with respect to the dimple so that slider bond pads 52 are aligned with FOS bond pads 65.

The present invention slider allows for slider 12 to be produced in bulk and in an automated process. Additionally, the mechanical features of slider 12 allow slider 12 to be placed on gimbal 28 with respect to the dimple such that proper placement is achieved in repetitive processes even with nonrobust flex to gimbal being used. The mechanical features of slider 12 can be added during a batch process at the wafer level.

Large currents or voltages associated with the charging or discharging of the transducer by electrostatic charge sources may possibly damage the reader element. Electrostatic charge may be generated any time during the fabrication, assembly, testing and shipment of the disc drive. Specifically, electrostatic charge may be generated during fabrication of the magnetoresistive head assembly, the head gimbal assembly, the E-block assembly, the final disc drive, electrical testing of components and shipment of the components. In response, various procedures and equipment have been installed to control electrostatic discharge (ESD) levels during every stage of handling through final disc drive assembly to prevent damage to the reader element caused by ESD.

To safeguard the transducer of slider 12 from possible electrostatic discharge and improving the conductivity of the discharge path between the slider and suspension, the improved HGA design 55 includes ground trace 70. Ground trace 70 includes a FOS bond pad 65 so that slider 12 will be electrically connected to ground trace 70. From FOS bond pad 65, ground trace 70 extends to a plateau portion 95 under slider 12, and extends beyond the trailing edge 48 of slider 12. The ground trace further extends beyond flex circuit material 75 to proximate the distal end of gimbal tongue 30. Ground trace 70 is connected to the distal end of the gimbal tongue 30 by a conductive adhesive 90. Conductive adhesive 90 can comprise of a stiff adhesive to provide good conductivity. Gimbal 28 is connected to the loadbeam 24, and loadbeam 24 is grounded. The improved HGA design 55 provides a bondline resistance of approximately $10^2$–$10^3$ ohms which provides an improvement over the prior art. The improved HGA design 55 also provides a grounding system that places slider 12 at the same electrical potential as the other mechanical components and electrical ground components, which improves bit error rate (BER), reduces system noise, and matches electrostatic discharge/EOS wafer design protection feature requirements.

The present invention allows slider 12 to be placed on flex circuit material 75 using an automated process. Due to limitations in the manufacturing process, the location of the FOS bond pads may change from assembly to assembly, making precise positioning of the bond pads more difficult to predict. Plateau portion 95 improves the likelihood of properly aligning slider bond pads 52 with FOS bond pads 65 by providing more room to compensate for potential misalignment. Plateau portion 95, while acting as a ground trace, also elevates slider 12 to the height of the FOS bond pads 65. This eliminates the alignment features such as extended bond pads or a slider notch. Improved HGA design 55 provides a strong interconnect between the FOS bond pads 65 and the slider bond pads 52, results in a high slider 12 to gimbal 28 bond strength, a small pitch static attitude shift, and provides a tolerance buffer which allows the slider 12 to be placed relative to the suspension assembly load point without degrading mechanical structure.

FIGS. 5–9 each includes features and advantages similar to FIGS. 4A–4B, therefore only the differences will be illustrated. Also, FIGS. 5–9 do not show slider 12 so as to more fully show plateau portion 95. It should be understood that slider 12 is assembled and connected to improved HGA designs in FIGS. 5–9 similarly to how slider 12 is shown in FIGS. 4A and 4B and previously described.

Figure 5:
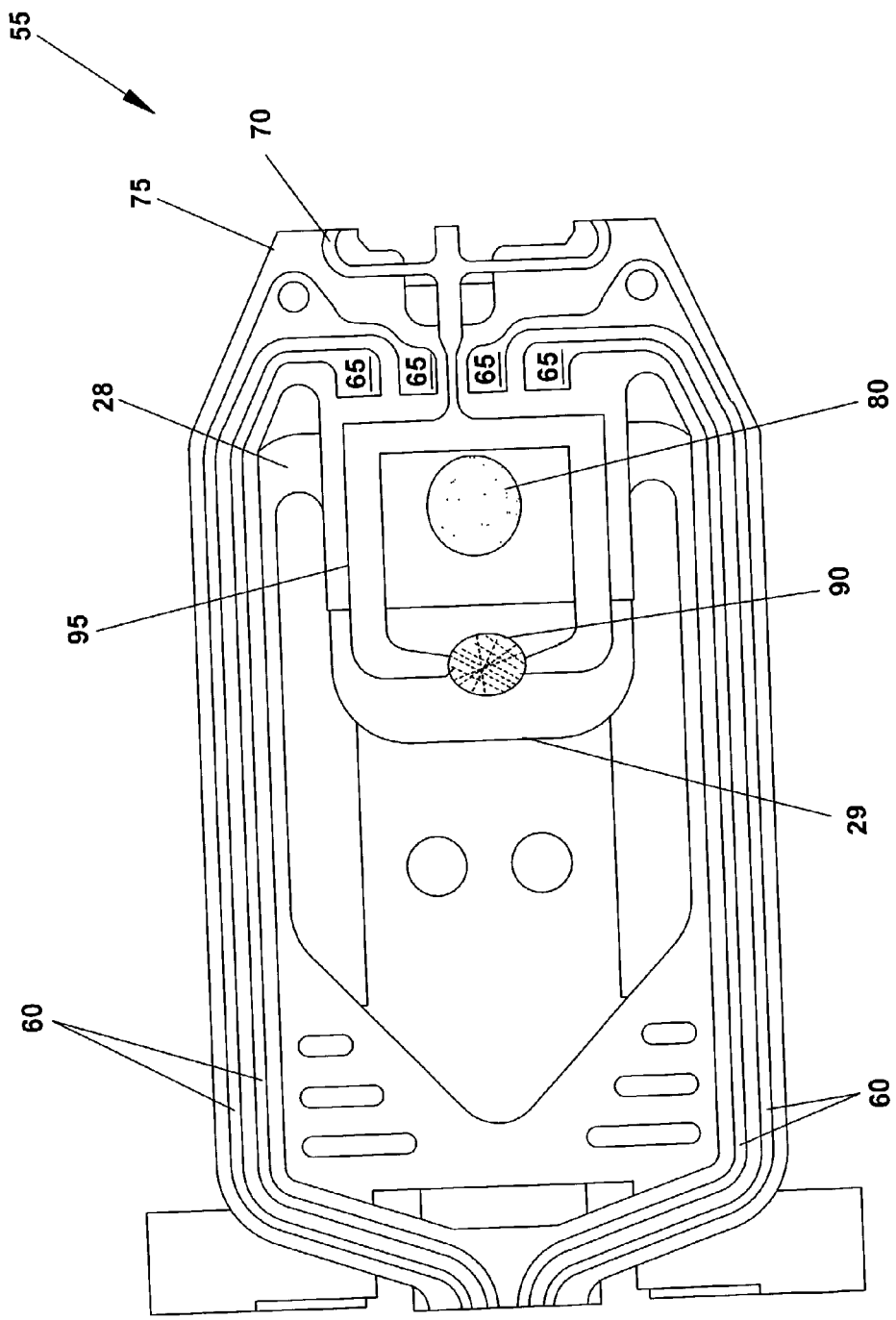
FIG. 5 shows an exploded perspective view of another embodiment of an assembled distal portion of the disk drive actuation system of FIG. 3.

FIG. 5 is an exploded perspective view of another embodiment of an assembled distal portion of the disk drive actuation system of FIG. 3. In this embodiment of improved HGA design 55, ground trace 70 is electrically connected to the non disk surface of slider 12 (not shown) by conductive adhesive 90, and is further connected to proximate end of the gimbal tongue 29 by conductive adhesive 90. Gimbal 28 is connected to load beam 24 which is grounded. The additional surface contact area between slider 12, ground trace 70 and gimbal 28 increases the conductivity of improved HGA design 55. The conductive adhesive used for this embodiment may be comprised of a flexible adhesive. This embodiment of improved HGA design 55 provides a bondline resistance of approximately $10^3$ to $10^6$ ohms.

Figure 6:
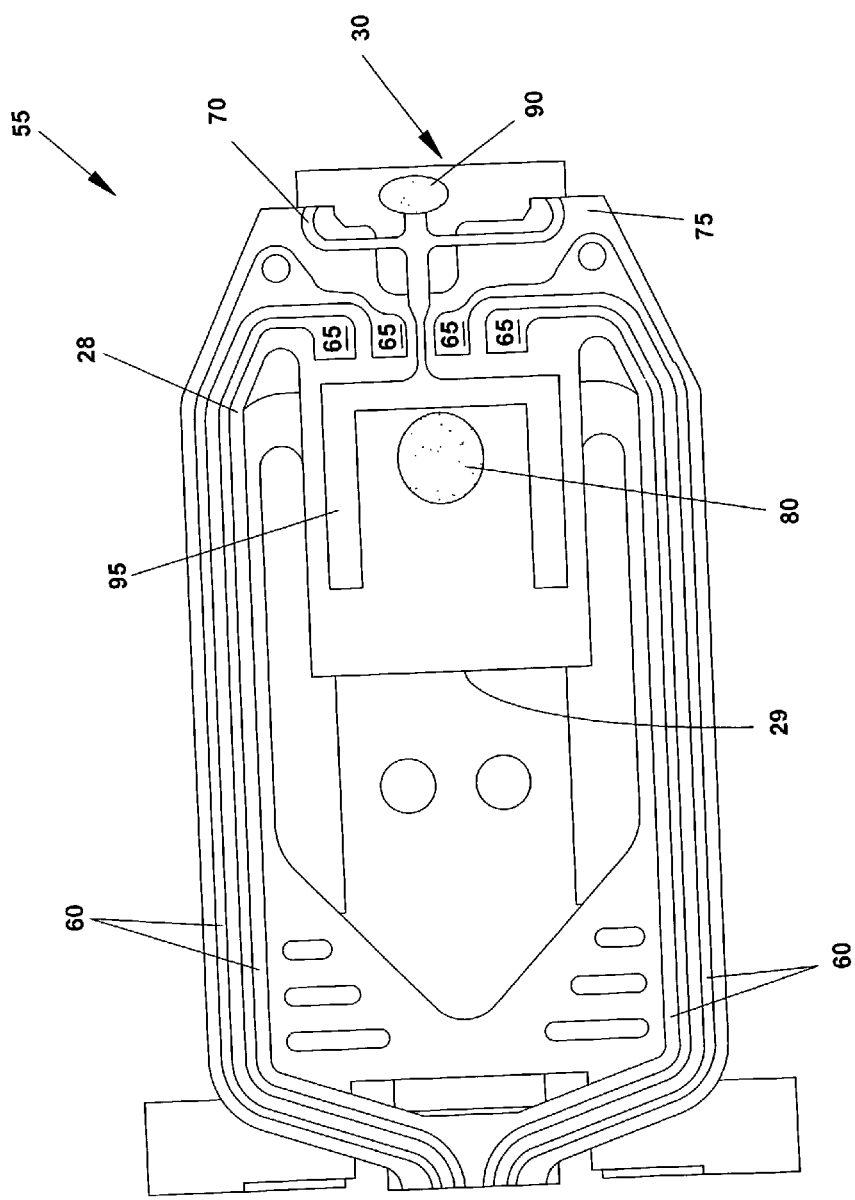
FIG. 6 shows an exploded perspective view of another embodiment of an assembled distal portion of the disk drive actuation system of FIG. 3.

FIG. 6 is an exploded perspective view of a further embodiment of improved HGA design 55 of FIGS. 4A and 4B. In this embodiment of improved HGA design 55, ground trace 70 is electrically connected to the non-disk surface of slider 12 (not shown) by the interface between plateau portion 95 and the non-disk surface of slider 12. Ground trace 70 extends to the distal end of gimbal tongue 30 and is thereby connected by conductive adhesive 90. Conductive adhesive 90 may be comprised of a stiff adhesive. This embodiment of improved HGA design 55 provides a bondline resistance of approximately $10^4$ to $10^5$ ohms.

Figure 7:
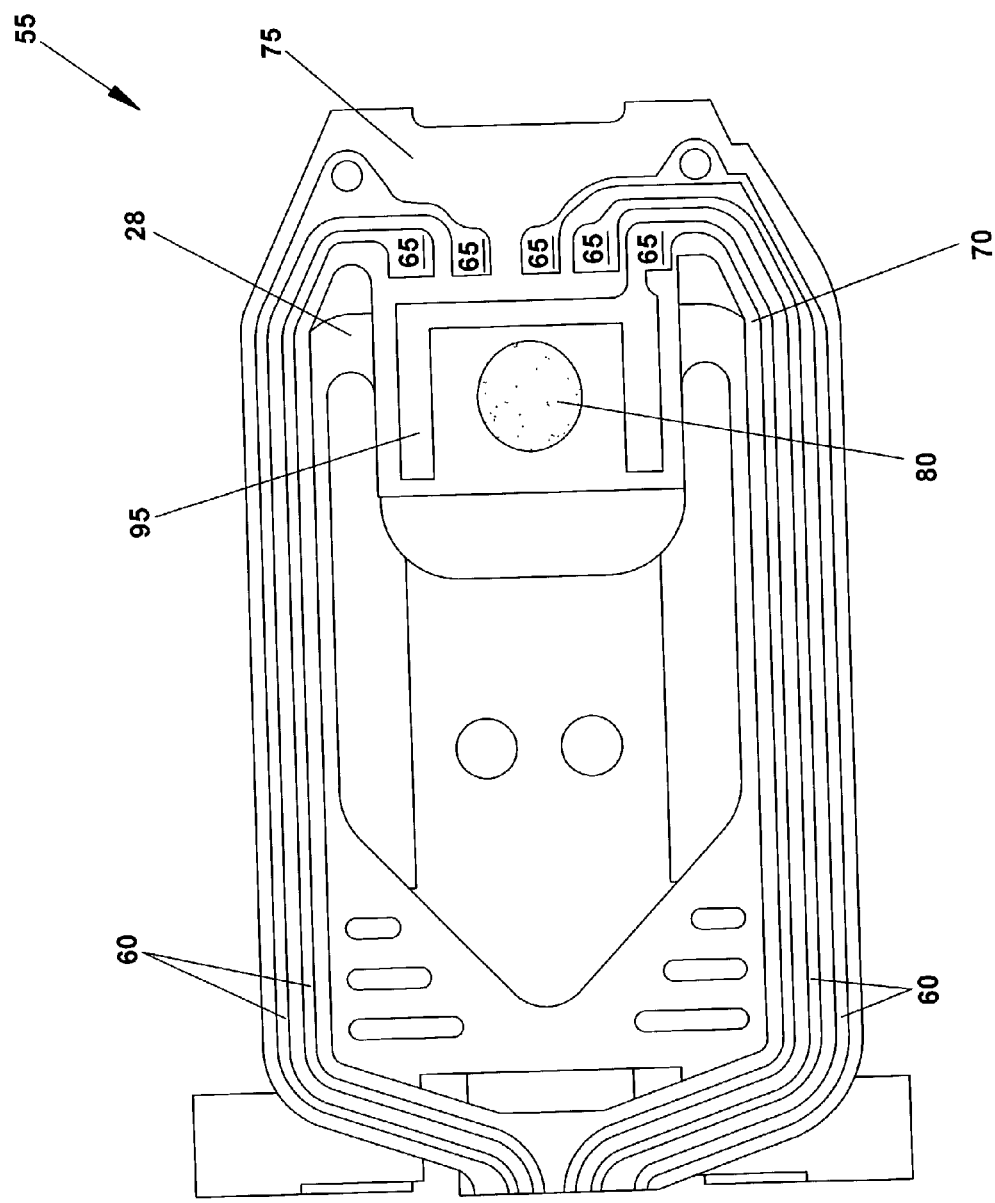
FIG. 7 shows an exploded perspective view of another embodiment of an assembled distal portion of the disk drive actuation system of FIG. 3.
Figure 8:
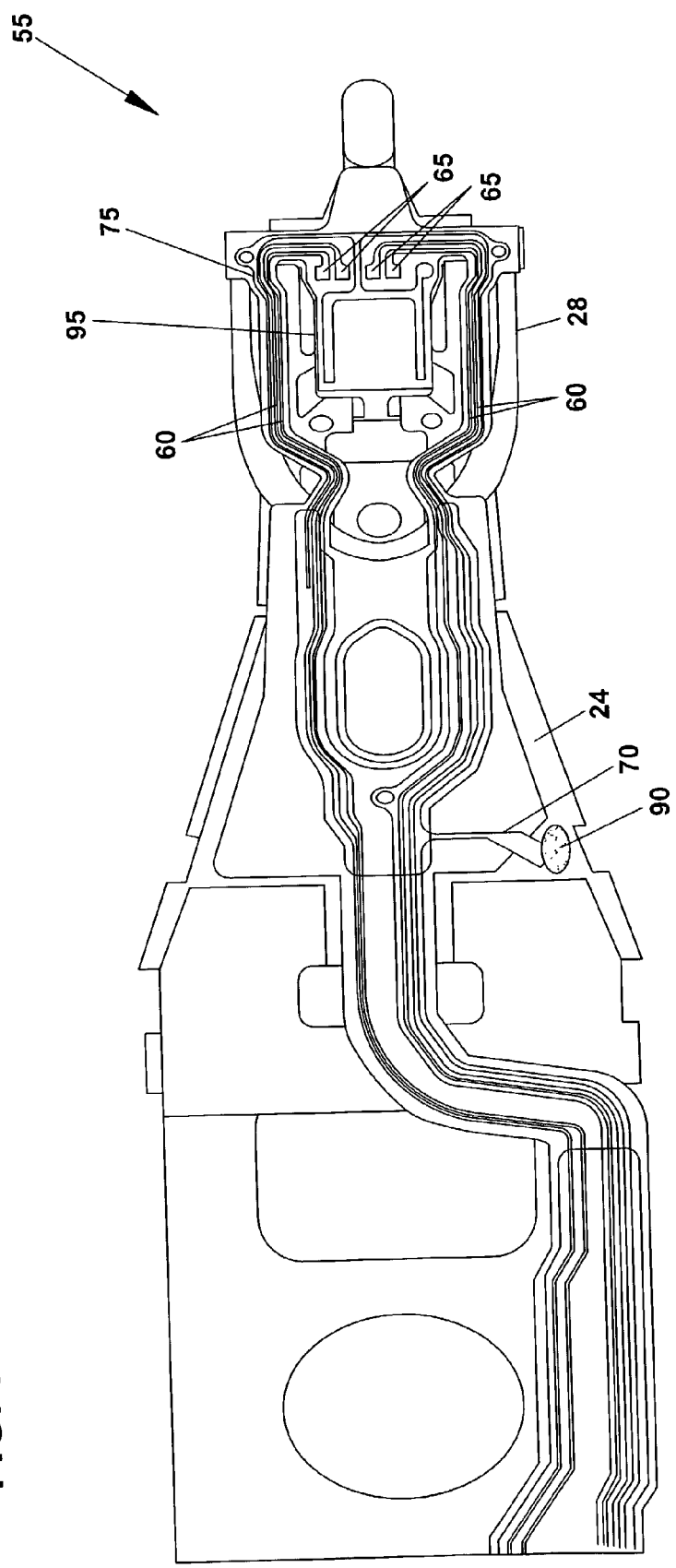
FIG. 8 shows an exploded perspective view of one embodiment of an assembled distal portion of the disk drive actuation system of FIG. 3.
Figure 9:
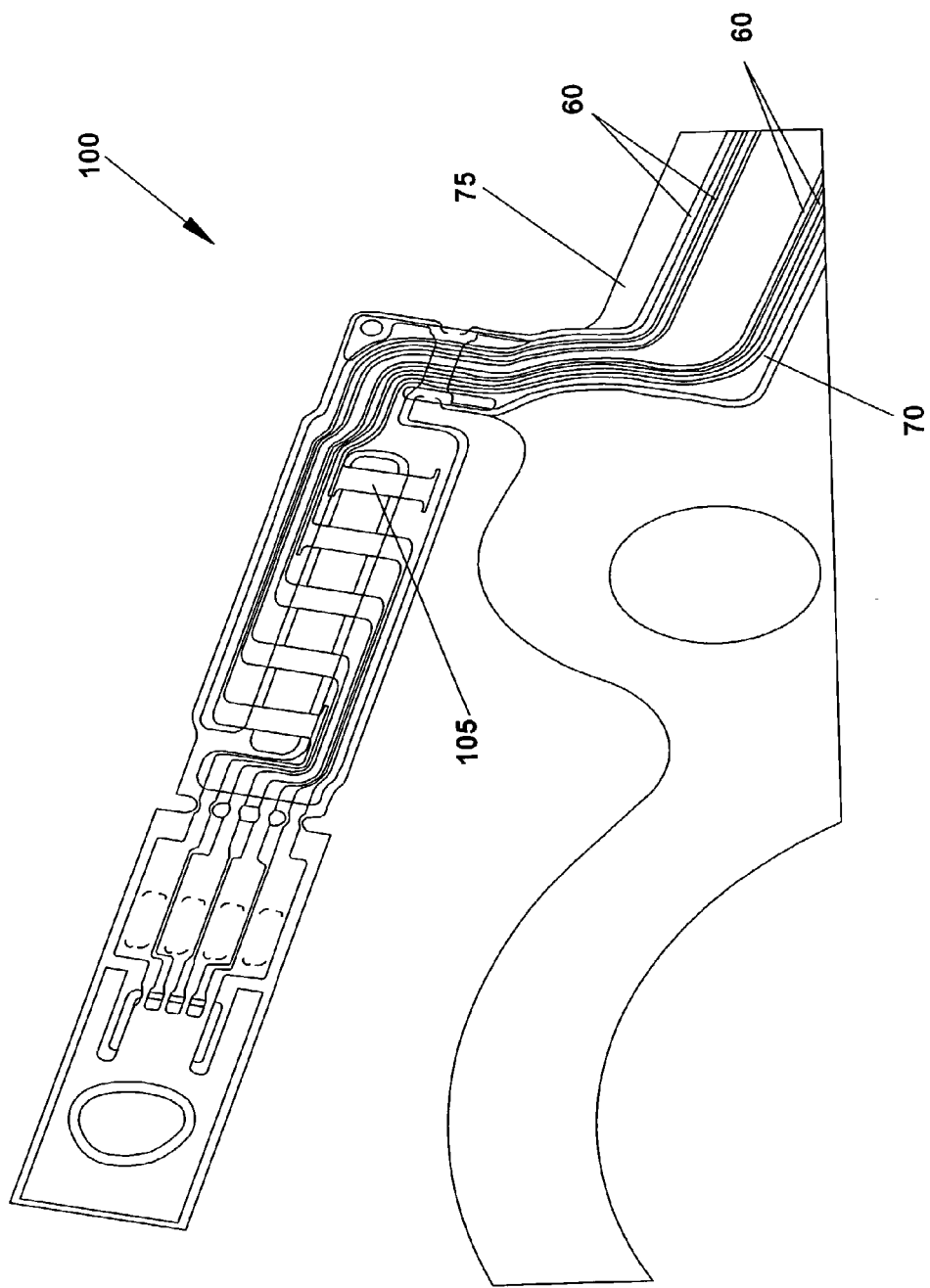
FIG. 9 shows an exploded perspective view of the distal portion of the flex circuit.

FIGS. 7, 8 and 9 further show another embodiment of improved HGA design 55 of FIGS. 4A and 4B. FIG. 7 is an exploded perspective of improved HGA design 55 with ground trace 70 routed back to the load beam and the PCC 21 (shown in FIG. 2). FIG. 8 is an elevated view of improved HGA design 55 with ground trace 70 routed to loadbeam 24. In this embodiment ground trace 70 is connected to loadbeam 24 by conductive adhesive 90, thereby providing a path to ground. Conductive adhesive 90 may be comprised of a stiff adhesive. This embodiment of improved HGA design 55 provides a bondline resistance of approximately $10^2$ to $10^4$ ohms. FIG. 9 is an exploded perspective of a distal portion of flex circuit material 75, wherein the ground trace 70 is routed back to pad 105. Pad 105 is bonded to the PCC 21, which is grounded to the drive body (not shown). This embodiment of improved HGA design 55 provides a bondline resistance of approximately 1 to 10 ohms. Both embodiments shown in FIGS. 8 and 9 and herein described may be simultaneously be grounded to the distal end of the gimbal tongue 30 as shown in FIGS. 4A, 4B and 6.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. An improved suspension assembly comprising:
 a suspension including a load beam and a gimbal;
 a flex circuit connected to the suspension, the flex circuit including a polymer portion, at least one ground trace and at least one bond pad; and
 a slider having a leading edge and a trailing edge, said trailing edge including a plurality of bond pads positioned proximate said at least one bond pad of said flex circuit, wherein said at least one ground trace is electrically connected to said at least one bond pad and said slider is electrically connected to said at least one bond pad by a ball bond, further wherein said at least one ground trace is electrically connected to said suspension by a conductive adhesive, and said at least one ground trace elevates said slider to a height of said at least one bond pad.

2. The improved suspension assembly of claim 1, wherein said slider includes a first surface adjacent a recording media and a second surface connected to said flex circuit, further wherein said at least one ground trace is positioned between said second face and said polymer of said flex circuit.

3. The improved suspension assembly of claim 2, wherein said gimbal includes a gimbal tongue having a proximal and distal end, further wherein said distal end of said gimbal tongue extends beyond the trailing edge of the slider.

4. The improved suspension assembly of claim 3, wherein said at least one ground trace extends beyond the trailing edge of the slider and ends proximate to the distal end of the gimbal tongue, further wherein said at least one ground trace is eledrically connected to said gimbal by said conductive adhesive.

5. The improved suspension assembly of claim 3, wherein said at least one ground trace is positioned between the distal end of the gimbal tongue and the second surface of said slider.

6. The improved suspension assembly of claim 1, wherein said at least one ground trace provides a bondline resistance of approximately 1 to $10^6$ ohms.

7. The improved suspension assembly of claim 1, wherein said at least one ground trace provides a bondline resistance of approximately $10^2$ to $10^3$ ohms.

8. The improved suspension assembly of claim 1, wherein said conductive adhesive is selected from the group consisting of a flexible conductive adhesive and a stiff conductive adhesive.

9. A disk drive comprising:
 an actuator arm;
 a suspension including a load beam and a gimbal, wherein said suspension, is connected to said actuator arm;
 a flex circuit connected to the suspension, the flex circuit including a polymer portion, at least one ground trace and at least one bond pad; and
 a slider having a leading edge and a trailing edge, said trailing edge including a plurality of bond pads positioned proximate said at least one bond pad of said flex circuit, wherein said at least one ground trace is electrically connected to saic at least one bond pad and said slider is electrically connected to said at least one bond pad by a ball bond, further wherein said at least one ground trace is electrically connected to said suspension by a conductive adhesive, and said at least one ground trace is positioned between said slider and said polymer portion thereby elevating said slider to a height of said at least one bond pad.

10. The disk drive of claim 9, wherein said slider includes a first surface adjacent a recording media and a second surface connected to said flex circuit, further wherein said at least one ground trace is positioned between said second surface and said polymer of said flex circuit.

11. The disk drive of claim 10, wherein said gimbal includes a gimbal tongue having a proximal and distal end, further wherein said distal end of said gimbal tongue extends beyond the trailing edge of the slider.

12. The disk drive of claim 11, wherein said at least one ground trace extends beyond the trailing edge of the slider and ends proximate to the distal end of the gimbal tongue, said at least one ground trace is eledrically conneded to said gimbal by said condudive adhesive, further wherein said at least one ground trace provides a bondline resistance of approximately $10^2$–$10^3$ ohms.

13. The disk drive of claim 11, wherein said at least one ground trace is positioned between the distal end of the gimbal tongue and the second surface of said slider.

14. The disk drive of claim 9, wherein said conductive adhesive is a flexible conductive adhesive.

15. The disk drive of claim 9, wherein said conductive adhesive is a stiff conductive adhesive.

16. An improved suspension assembly comprising:
 a suspension including a load beam and a gimbal;
 a flex circuit connected to the suspension, the flex circuit including a polymer portion, at least one ground trace and at least one bond pad; and a slider having a leading edge and a trailing edge, said trailing edge including a plurality of bond pads positioned proximate said at least one bond pad of said flex circuit, wherein said at least one ground trace is electrically connected to said at least one bond pad and said slider is electrically connected to said at least one bond pad by a ball bond, further wherein said at least one ground trace is electrically connected to said suspension thereby providing a bondline resistance of approximately 1 to $10^6$ ohms and said at least one ground trace elevates said slider to a height of said at least one bond pad.

17. The improved suspension assembly of claim 16, wherein said at least one ground trace is electrically connected to said gimbal thereby providing a source to ground.

18. The improved suspension assembly of claim 16, wherein a portion of said at least one ground trace that elevates said slider is positioned between said slider and said polymer portion, further wherein said portion of said at least one ground trace is shaped like a horseshoe.

* * * * *